United States Patent Office 3,408,853
Patented Nov. 5, 1968

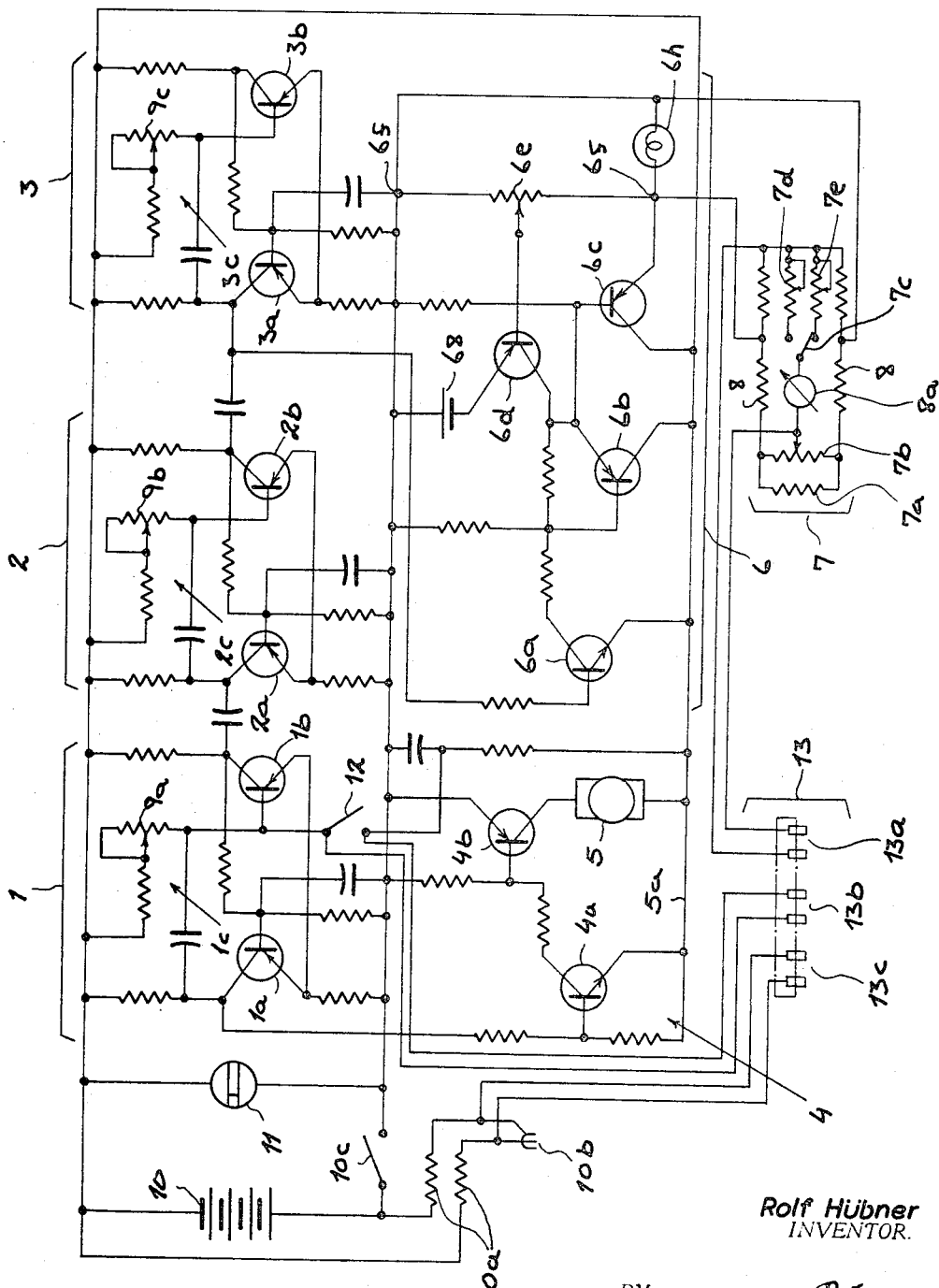

3,408,853
PORTABLE GAS ANALYSER WITH TIME DELAY
Rolf Hübner, Westfalendamm 267, Dortmund, Germany
Filed Jan. 18, 1966, Ser. No. 521,395
Claims priority, application Germany, Jan. 19, 1965,
H 54,894
7 Claims. (Cl. 73—23)

My present invention relates to portable gas analysers of the type described and illustrated in my copending applications Ser. No. 416,655 of Dec. 7, 1964, now U. S. Patent No. 3,266,293 issued Aug. 16, 1966, Ser. No. 427,047 of Jan. 2, 1965 and Ser. No. 440,223 of Mar. 16, 1965, now U.S. Patent No. 3,343,402 issued Sept. 26, 1967. More particularly, the instant invention relates to improvements in portable gas analysers of this character in which pump means is operated by a timing circuit to draw an ambient gas into a measuring chamber and a measuring circuit is thereupon energized to determine the concentration of one or more components of the gas mixture thus aspired into the measuring chamber.

As I have observed in the copending applications, it is a common practice to provide portable gas analysers for use in subterranean locations (e.g. mine shafts and tunnels) for the detection of the presence of certain dangerous or inconvenient components of the ambient gas mixture (e.g. carbon monoxide, methane or carbon dioxide) and, more particularly, to indicate the concentration of the particular component of interest. In the advanced portable measuring instruments of the copending applications, the gas is drawn into a measuring chamber by a motor-driven pump means energized from a self-contained source of electric current such as a rechargeable battery. Within the measuring chamber, I provided a means sensitive to the concentration of the particular component of interest, e.g. a pair of spaced-apart plates or electrodes adapted to measure the resistance of the gas between the electrodes usually after this gas has been catalytically reacted with oxygen to provide a direct reading in terms of the concentration of the particular component via a measuring circuit. The latter can include a resistance bridge or other network supplied with unidirectional electric current, preferably via a voltage-stabilizing circuit, while an indicator means such as a galvanometer is included in the bridge to indicate the concentration of the component of interest. To ensure reproducibility of the analysis and its accuracy, the circuit means of the device comprises generally a timer in the form of electronic switch means for initiating operation of the pump means for a predetermined period and sequentially triggering the measuring network. The circuit can be energized by a pushbutton upon the housing of the portable device or from a remote location via a suitable transmission line to which the portable device can be removably connected, e.g. via a plug-and-jack assembly, when it is desired to mount the portable device for temporary service at a particular station as described, for example, in my copending application Ser. No. 521,104, filed Jan. 17, 1966. Upon energization of the timing network, the pump means is activated and remains active for a variable time period depending upon the parameters of an R-C circuit of the first timer network and then another timer network is energized for cutting in the measuring network substantially simultaneously with the cutting-off of the pump means. While such a system has been found to be highly advantageous when compared with others of prior constructions, there was still found to be some lack of reproducibility present.

It is, therefore, an important object of the present invention to provide a portable gas analyser which is of high reproducibility and exactness in measurement of the concentration of one or more components of an ambient gas mixture.

A further object of this invention is to extend the principles set forth in my earlier-filed copending applications mentioned above to still more accurate gas-analysing devices.

These objects and others which will become apparent hereinafter are attained, in accordance with the present invention, by providing a portable gas analyser of the general character described, i.e. having a housing provided with indicating means for registering the concentration of a particular component of a gas mixture, a measuring chamber into which ambient gases are induced by a pump means, a measuring circuit energizable to determine the concentration of that component in the gas mixture induced into the measuring chamber and providing an indication thereof upon a meter or other indicating means, and circuit means within the housing and controlled by a push-button or other device for timing the sequence of operation of the pump means and the measuring circuit, the timer means including a time-delay network of adjustable time constant for delaying energization of the measuring circuit for a period of, subsequent to cut-off of the pump means, at least one second, and preferably one to five seconds, to permit passivation of the gases within the measuring chamber and permit the latter to reach a quiescent state. Thus, the control circuit of a portable gas analyser, according to this invention, includes, in addition to an electronic timing switch actuatable for initiating operation of the pump means and controlling the duration thereof, an intermediate stage between the first timer stage and the last timer stage and is energizable upon deactivation of the pump means and prior to actuation of the third timer stage (which controls the duration of operation of the measuring circuit) with an adjustable time delay after deactivation of the pump means. It has been found, in this connection, that omission of this time delay and commencement of the measuring cycle immediately upon termination of the pumping operation results in substantially irregular measurement, nonuniform catalytic combustion of the gas mixture and a highly disadvantageous lack of reproducibility of the measuring operation. This disadvantage has been traced to residual vortex and turbulent flow characteristics in the measuring chamber at the end of the pumping action and during the initial moments of the measuring cycle. By ensuring the time delay of at least one second between the activation of the pump means and the energization of the voltage-regulator circuit of the measuring networks, it is possible to ensure a substantially quiescent state before measurement occurs and thus guarantee the reproducibility of the system. Another advantage of such a system is that it is not necessary for the operator of the device to maintain the "measuring" pushbutton of the unit in a depressed state for any particular length of time in order to ensure proper commencement of the measuring operation, nor is it required that the initiation of the measuring cycle be commenced by the operator.

The above and other objects, features and advantages of the present invention will become more readily apparent from the following description, reference being made to the accompanying drawing in which the sole figure is a circuit diagram of a portable gas analyser according to this invention.

From the drawing, it will be apparent that the gas-analyser circuit can comprise a rechargeable source of electric current such as the battery 10 which can be of the type illustrated and described in my copending application Ser. No. 427,047. The meter 8a of the measuring circuit represents the indicator of the latter and can be a galvanometer connected in the diagonal of a resistance-sensitive means responsive to the concentration of a component of a gas mixture. A pushbutton 12 is depressible to commence the measuring operation, while a voltmeter 11 is provided to show the state of charge of the battery, preferably in terms of measuring cycles remaining.

Within the measuring chamber, I provide resistance-responsive electrodes, here represented by the resistors 8, for measuring the conductance or resistance of a gas mixture induced into a measuring chamber by a pump whose motor is illustrated at 5. The measuring chamber and pump arrangement can be any of those described in the aforementioned copending applications. The housing of the apparatus is preferably provided with a plug-in jack connection 13 (see Ser. No. 521,104), whose contacts 13a, 13b and 13c will be described in greater detail hereinafter but are adapted to be received within a jack (not shown) at a fixed location along a transmission net of a mine or other subterranean location at which the portable gas-analysing device can be temporarily stationed as a fixed transmitter of the concentration of the gas to which the device is responsive. From the jack, a transmission line can run through the mine to a plurality of similar stations and to a charging device for recharging the battery of the portable analyser and to a meter, recorder or other indicating device adapted to provide an indication of the concentration of the particular component within the mixture at the monitoring station.

The measuring network 7 comprises in addition to the electrodes represented by resistors 8, a pair of parallel resistors 7a, 7b, the latter of which is provided with a wiper and serves to calibrate the resistance bridge. A switch 7c in the indicator diagonal of the bridge can selectively connect the meter 8a in series with potentiometers 7d and 7e, adapted to be placed in series with the resistance bridge for matching it with the indicator at the remote monitoring station or the indicator within the housing of the portable gas analyser, as may be required. The bridge 7 thus delivers its output to the galvanometer 8a and, when the plug-and-jack system 13 is connected, to the remote monitoring station via the contacts 13a.

The battery 10 is rechargeable through resistors 10a from the contact 13c of the plug-and-jack system 13 when the portable gas analyser is one station of a mine network; alternatively, recharging of the battery 10 can be effected via a jack 10b on the housing of the analyser when the instrument is used as a portable unit and is returned to the home station with the attendant. To supervise the level of charge of the battery 10, I provide a voltmeter 11, as previously indicated, which is calibrated in terms of number of measuring cycles remaining and which is connected across the battery 10 when the main on-off switch 10c is closed. When the latter is open, the measuring circuit of the apparatus is cut off and, if the unit is in place at its fixed station within the mine, it can only be recharged and cannot be actuated to commence a measuring cycle. Thus, any number of units may be placed throughout the mine and turned on or off via the respective switch 10c. The indicating device 11 is illustrated in greater detail in my application Ser. No. 427,047. Between the battery 10 and the voltage-stabilizing circuit 6 of the measuring network 7, I provide a timer circuit 1, 2, 3 which will be described in greater detail hereinafter. The voltage-stabilizing circuit 6 is provided with the usual biasing resistors for a plurality of amplifier transistors 6a, 6b and 6c, as well as with a control transistor 6d whose base is connected to a potentiometer 6e bridged across the output terminals 6f of the voltage-stabilizing network, so that it serves as a voltage-sensitive divider to vary the conductivity of transistor 6d and thus the degree to which transistors 6a, 6b and 6c modify the voltage at these terminals in accordance with fluctuation tendencies in the conventional manner. The voltage stabilizer 6 is generally similar to that described in my earlier applications and is conventional, as has been noted, so that it need not be described in greater detail herein. A biasing battery 68 is provided for the voltage-sensing or control transistor 6b while a glow lamp 6h provides an indication of the "on" state of the measuring circuit.

The plug contacts 13a of the circuit are bridged across the measuring instrument 8a preferably via equalizing resistor 7d or 7e which can be connected in circuit via the switch 7c. The latter can be set during portable operations of the unit such that one potentiometer is connected in the measuring circuit to accommodate the latter to the particular indicating instrument employed.

The measuring circuit 7 is energized via the timing circuit 1, 2, 3 consisting of three successively operable electronic monostable multivibrator switches in a ring-counter-type electronic (transistor) switch chain. The individual stages 1, 2 and 3 each function as described in my aforementioned applications as monostable multivibrators and remain in an "on" state after being triggered for a period determined by the time constant of the respective network and hereafter deliver an "on" pulse to the next network. Thus, each network is turned on for a period of time determined by its respective R-C network and serves in turn to operate the next timing network, even after the input signal is discontinued, for the present time period. The first timer includes a pair of transistors 1a and 1b together with the usual biasing resistors as well as an adjustable-time-constant R-C network 1c. The latter comprises a capacitive branch as well as a resistive branch including a potentiometer, as can be seen from the drawing. The first timing network 1 energizes the pump motor 5 via a voltage-stabilizing electronic switch 4 whose transistors 4a and 4b are again provided with the usual biasing resistors and function as ganged amplifiers. Thus, the control signal from the collector of transistor 1a is communicated to the base of transistor 4a to render the latter conductive and thus apply a control signal to the base of transistor 4b. When the latter is rendered conductive, it forms a path for current from the positive terminal of the battery 10 to the motor 5, the negative terminal of the battery being returned to the motor 5 via the bus bar 5a; closure of switch 12 activates the transistor 1b to commence a timing cycle and place the pump motor 5 in an "on" state for a period determined by the time constant of the resistance-capacitance network of the first timer circuit 1. Upon the termination of this period, a control signal is delivered to the intermediate or delay timer 2 whose transistors 2a and 2b are again connected in a monostable multivibrator arrangement with an adjustable-time constant R-C network 2c. After a period of at least one second subsequent to termination of operation of motor 5, a signal is delivered by the time delay circuit 2 to the timer circuit 3 whose transistors 3a and 3b and timer-constant network 3c operate as previously described to energize the measuring circuit 7 via the voltage-regulating network 6. The measuring circuit 7 is also operated for a duration determined by its R-C circuit, each of the R-C networks having a respective variable resistance 9a, 9b or 9c for setting the time constant. The switch 12 is shunted by contacts 13b which permit the measuring cycle to be initiated from a remote location.

The invention described and illustrated is believed to admit of many modifications within the ability of persons skilled in the art, all such modifications being considered within the spirit and scope of the appended claims.

I claim:

1. A control circuit for a portable gas analyser having a measuring chamber, electrically operable pump means for inducing a flow of ambient gas into said chamber, an electrically operable measuring circuit for determining the concentration of a component of the gas induced into said chamber, and indicator means for producing a reading of the concentration of said component, said control circuit comprising:
   a source of electric current;
   a first timer network connected between said source and said pump means and energizable for supplying said pump means with electric current from said source for a first predetermined time period;

a second timer network connected with said first timer network and energizable thereby upon the deactivation of said pump means; and a third timer network connected with said second timer network and energizable thereby after the elapse of a predetermined delay period and interposed between said measuring circuit and said source for connecting said measuring circuit with said source for a second predetermined time period.

2. A control circuit as defined in claim 1 wherein said second timer network includes a resistance-capacitance network of adjustable time constant for setting said predetermined delay period to a value of at least one second.

3. A control circuit as defined in claim 2 wherein each of said timer networks includes a respective pair of transistors connected in monostable-multivibrator arrangements with respective resistance-capacitance networks for determining the conductive periods of each of the monostable-multivibrator arrangements, said arrangements forming a chain of successively conductive electronic switches.

4. A control circuit as defined in claim 3 wherein said measuring circuit includes a gas-concentration-sensitive element in said chamber, and a transistor-voltage stabilizer connected between said element and said third timer network and connected to said voltage stabilizer.

5. A control circuit as defined in claim 3 wherein said first timer network includes a switch actuatable for initiating said first predetermined period, and contact means bridged across said switch for triggering said first timer network from a remote location.

6. A control circuit as defined in claim 3 wherein said source is a rechargeable battery, said circuit further comprising jack means for recharging said battery.

7. A control circuit as defined in claim 3, further comprising transistor switch means operable by said first timer network and interposed between said pump means and said source.

References Cited

UNITED STATES PATENTS

| 3,266,293 | 8/1966 | Hübner | 73—23 |
| 3,276,241 | 10/1966 | Hübner | 73—23 |
| 3,343,402 | 9/1967 | Hübner | 73—23 |

RICHARD C. QUEISSER, *Primary Examiner.*

C. IRVIN McCLELLAND, *Assistant Examiner.*